United States Patent

Hamano

[11] Patent Number: 5,818,646
[45] Date of Patent: Oct. 6, 1998

[54] ZOOM LENS OF REAR FOCUS TYPE

[75] Inventor: Hiroyuki Hamano, Kanagawa-ken, Japan

[73] Assignee: Canon Kabushiki Kaisha, Tokyo, Japan

[21] Appl. No.: 962,883

[22] Filed: Nov. 7, 1997

Related U.S. Application Data

[63] Continuation of Ser. No. 653,196, May 24, 1996, abandoned.

[30] Foreign Application Priority Data

May 30, 1995 [JP] Japan ................................ 7-131822
Mar. 29, 1996 [JP] Japan ................................ 8-103368

[51] Int. Cl.$^6$ ............................ G02B 15/14; G02B 9/00
[52] U.S. Cl. ........................ 359/684; 359/685; 359/740
[58] Field of Search ................................ 359/684, 685, 359/677, 676, 683, 740

[56] References Cited

U.S. PATENT DOCUMENTS

| | | | |
|---|---|---|---|
| 4,094,586 | 6/1978 | Sato et al. | 359/684 |
| 4,702,567 | 10/1987 | Kato et al. | 359/685 |
| 4,988,174 | 1/1991 | Horiuchi et al. | 350/427 |
| 5,050,972 | 9/1991 | Mukaiya et al. | 359/683 |
| 5,134,524 | 7/1992 | Hamano et al. | 359/687 |
| 5,138,492 | 8/1992 | Hamano et al. | 359/684 |
| 5,299,064 | 3/1994 | Hamano et al. | 359/684 |
| 5,430,576 | 7/1995 | Hamano | 359/684 |
| 5,546,230 | 8/1996 | Sato et al. | 359/684 |

FOREIGN PATENT DOCUMENTS

| | | |
|---|---|---|
| 0425949 | 5/1991 | European Pat. Off. . |
| 0506108 | 9/1992 | European Pat. Off. . |
| 62-24213 | 2/1987 | Japan . |
| 62-247316 | 10/1987 | Japan . |
| 4-43311 | 2/1992 | Japan . |
| 4-301612 | 10/1992 | Japan . |
| 6-337375 | 12/1994 | Japan . |

OTHER PUBLICATIONS

Patent Abstracts of Japan, vol. 95, No. 3, Apr. 28, 1995 (JP 6–337375).

*Primary Examiner*—Georgia Y. Epps
*Assistant Examiner*—Evelyn A. Lester
*Attorney, Agent, or Firm*—Fitzpatrick, Cella, Harper & Scinto

[57] ABSTRACT

A zoom lens of the rear focus type is disclosed, comprising, in order from an object side, a first lens unit of positive refractive power, a second lens unit of negative refractive power, a third lens unit of positive refractive power, a fourth lens unit of positive refractive power and a fifth lens unit of negative refractive power, wherein at least the second lens unit and the fourth lens unit are moved to vary magnification and the fourth lens unit is moved to effect focusing, and wherein an aperture stop is located in a space between the third lens unit and the fourth lens unit.

8 Claims, 11 Drawing Sheets

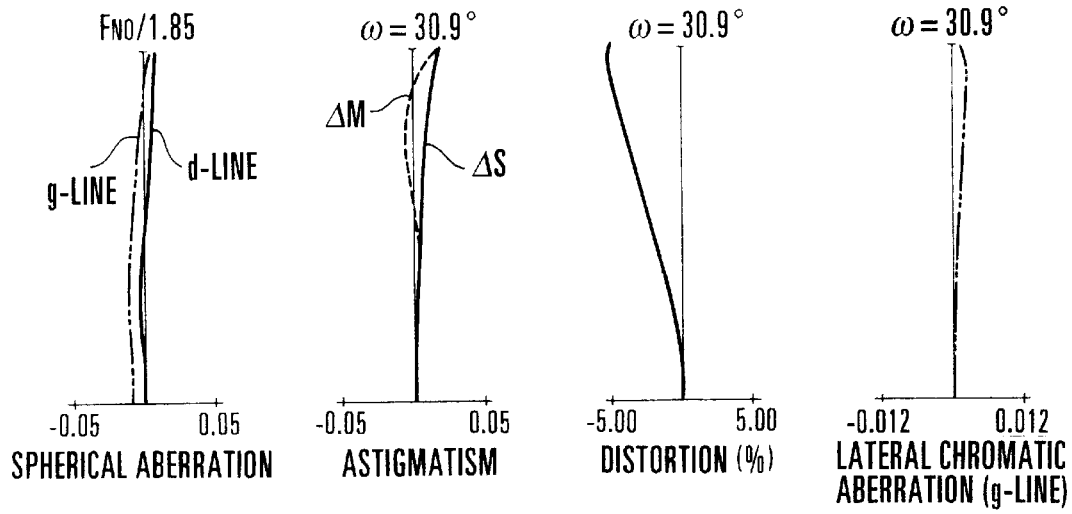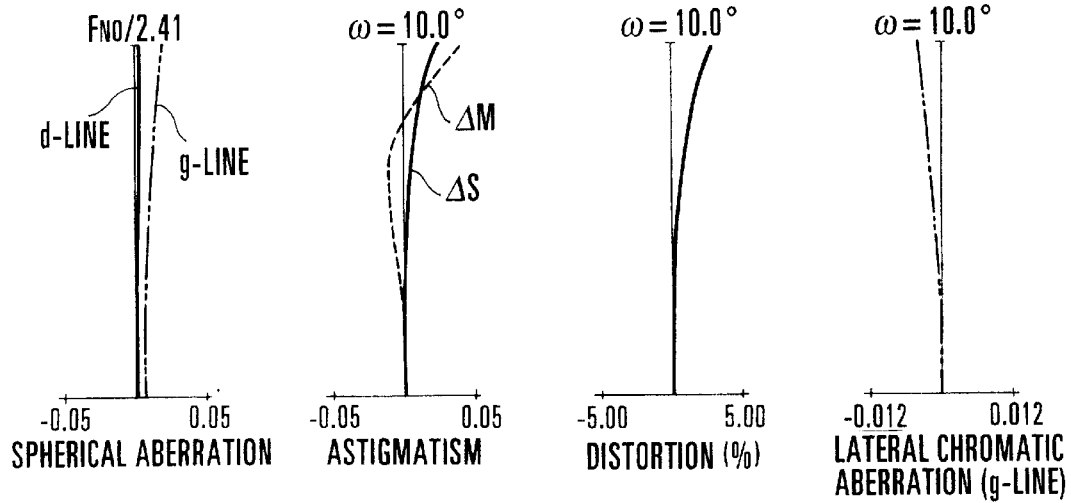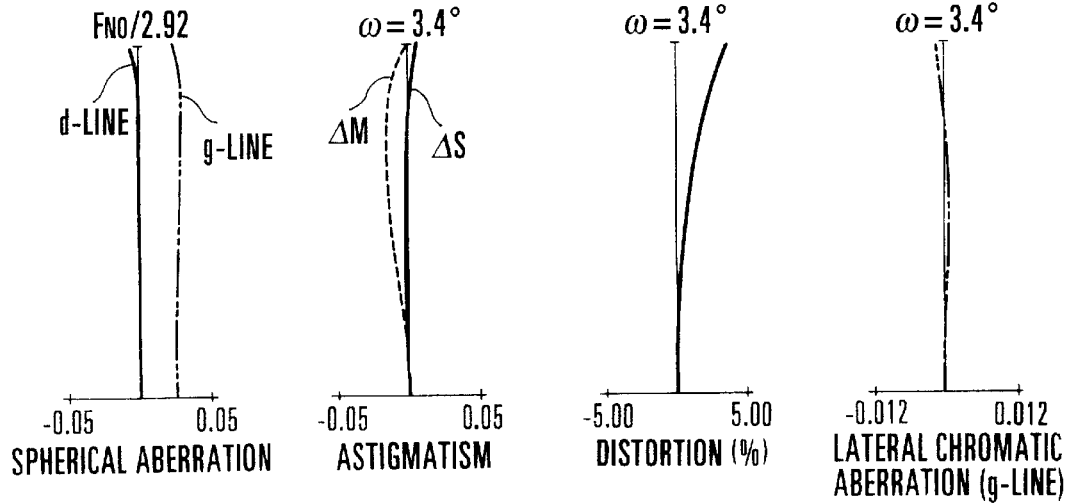

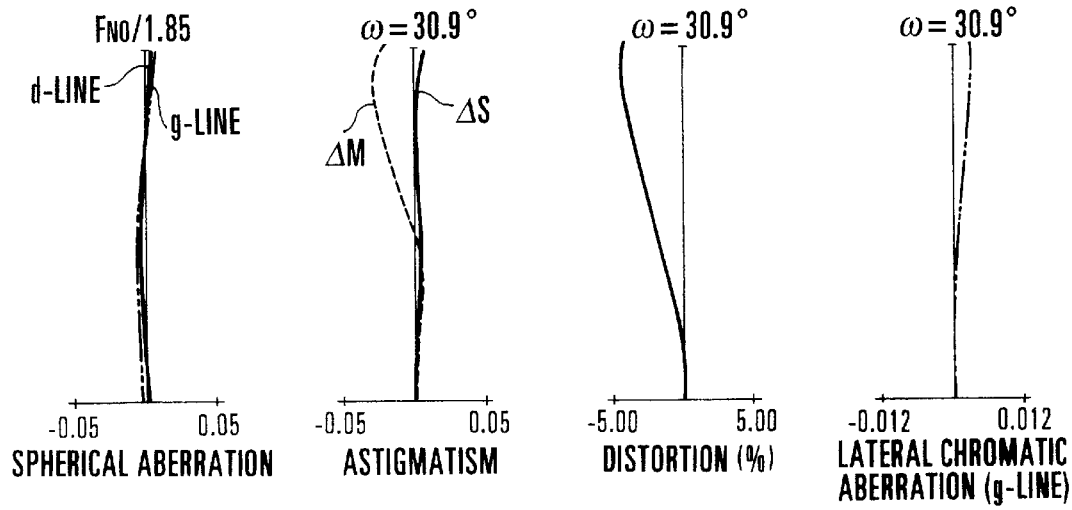
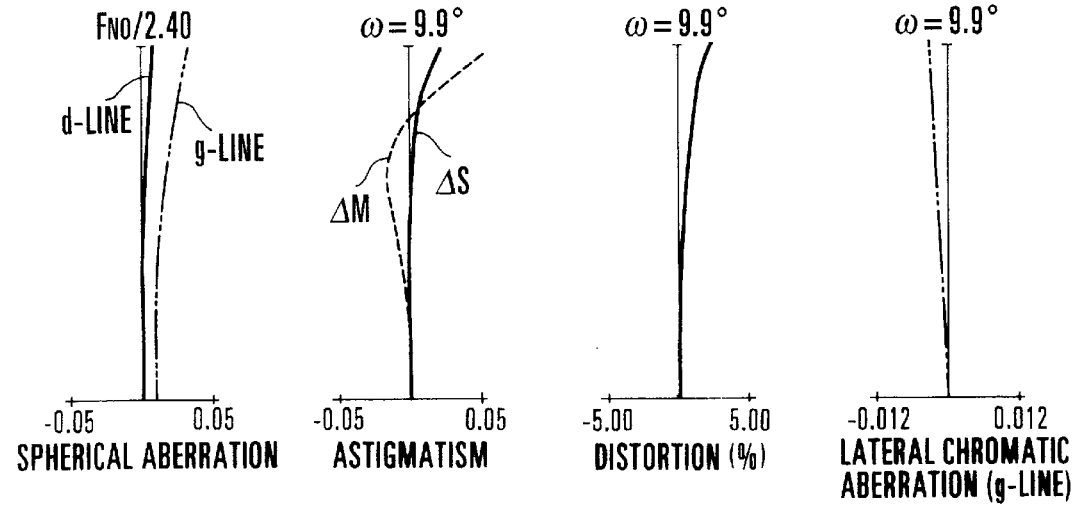
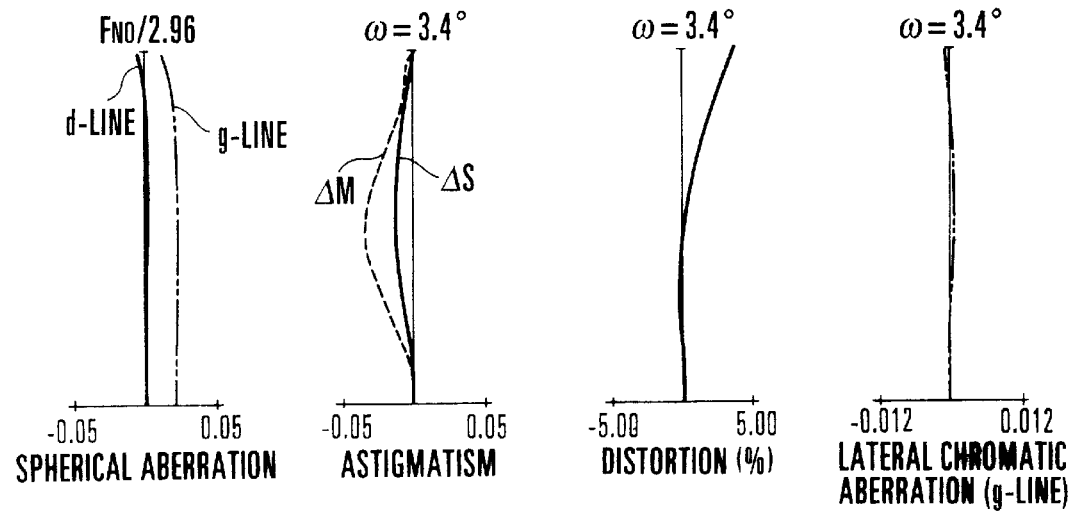

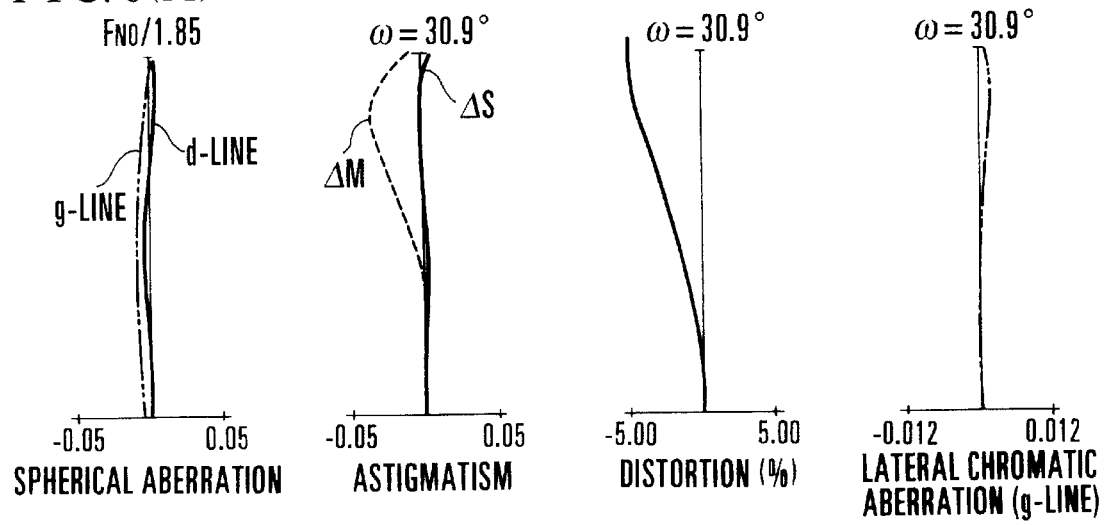
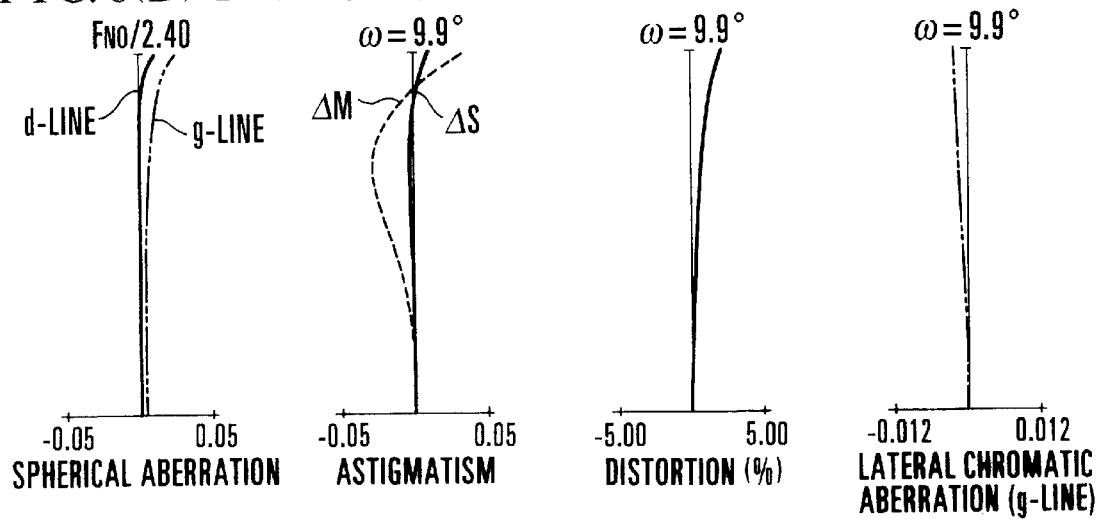
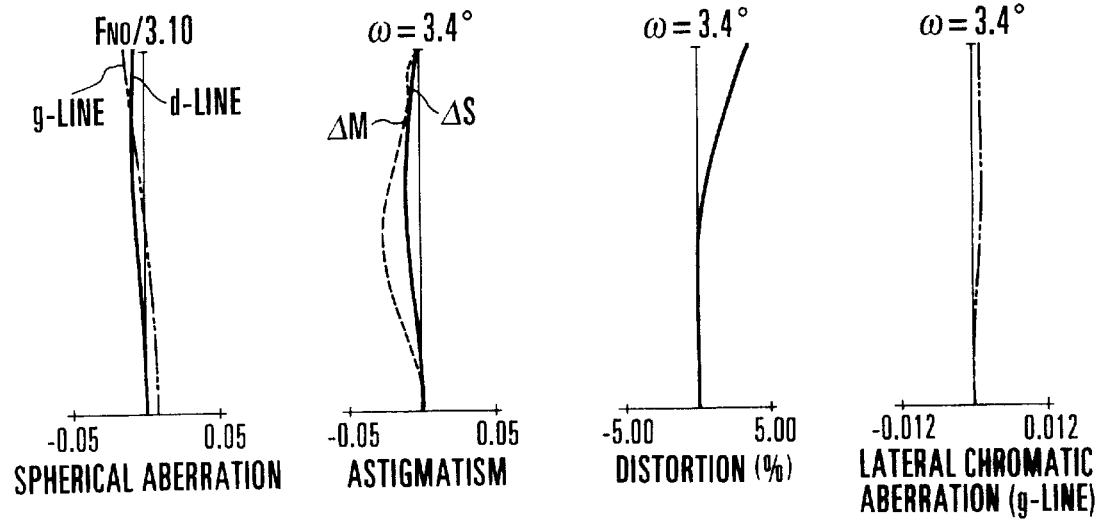

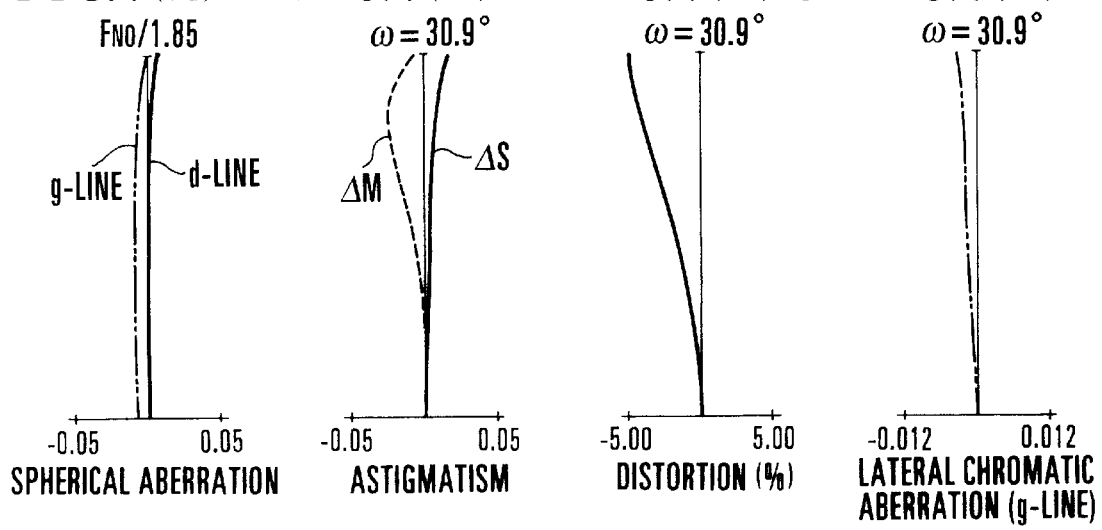
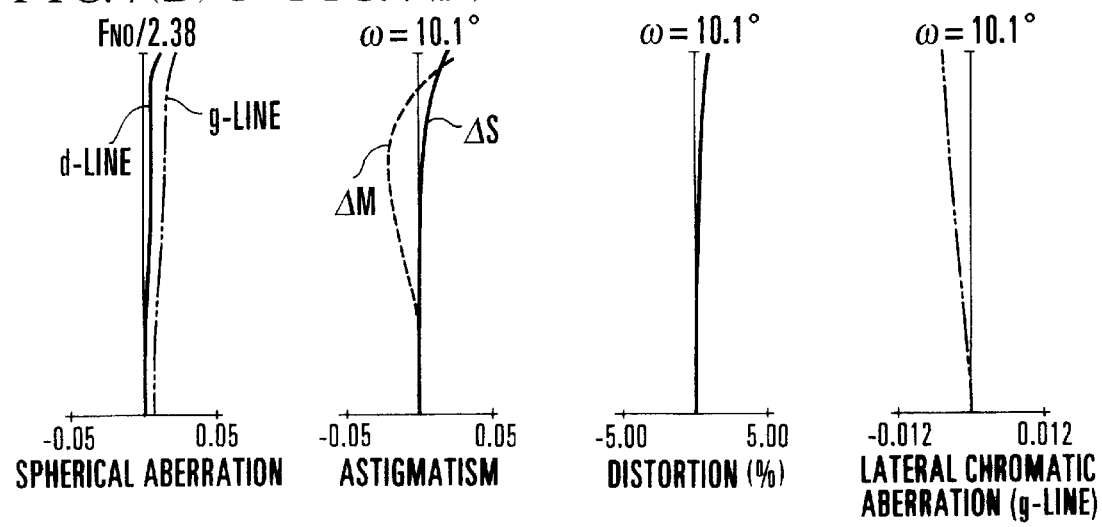
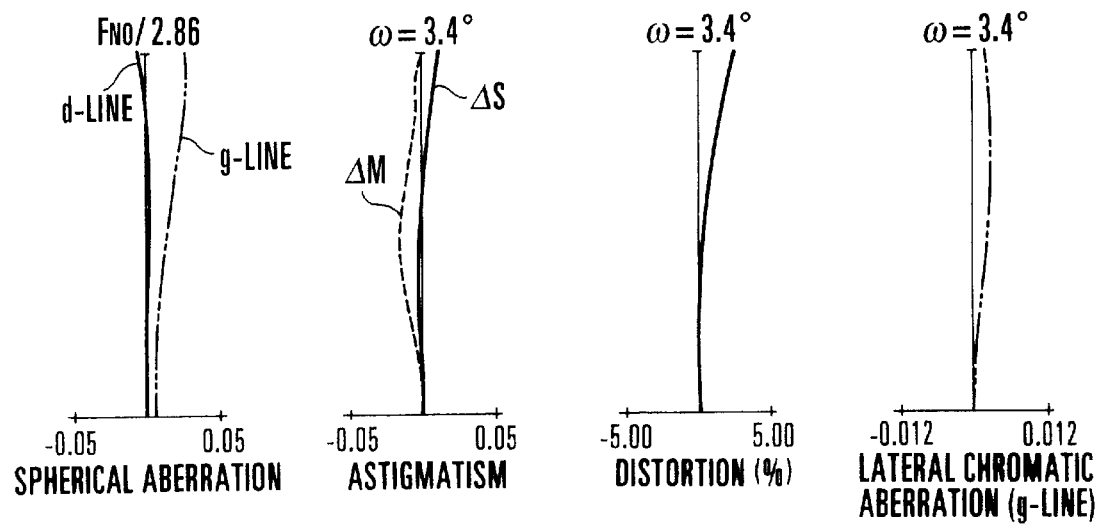

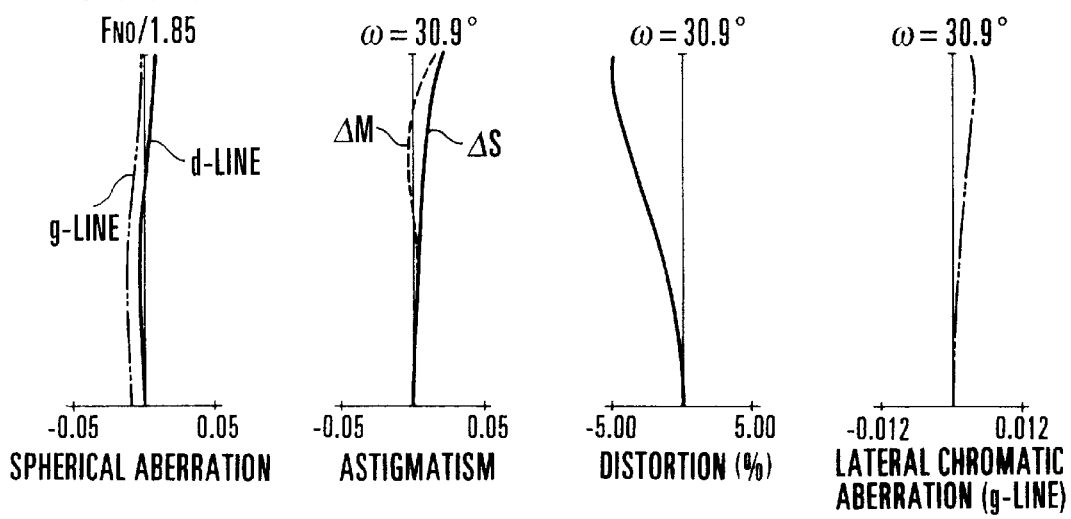
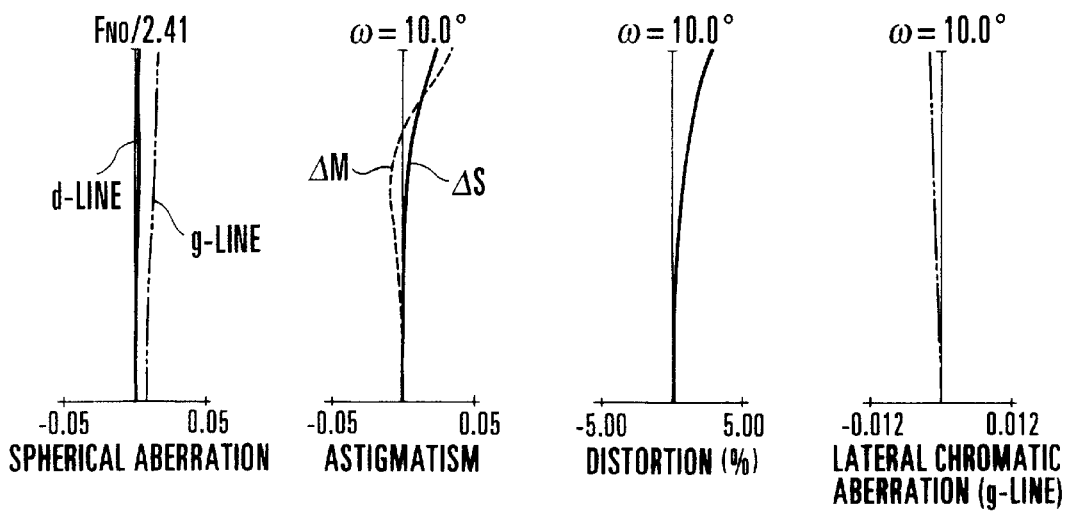
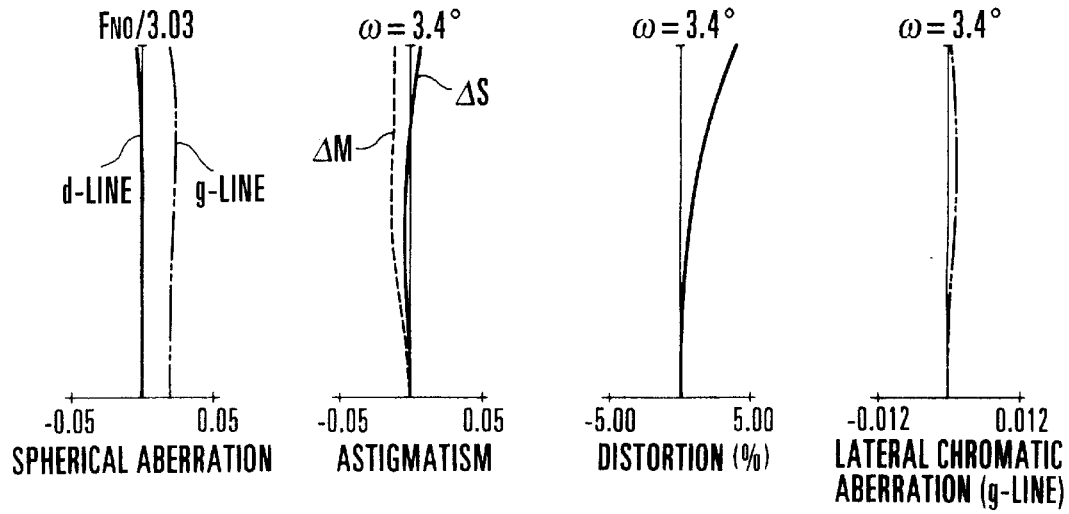

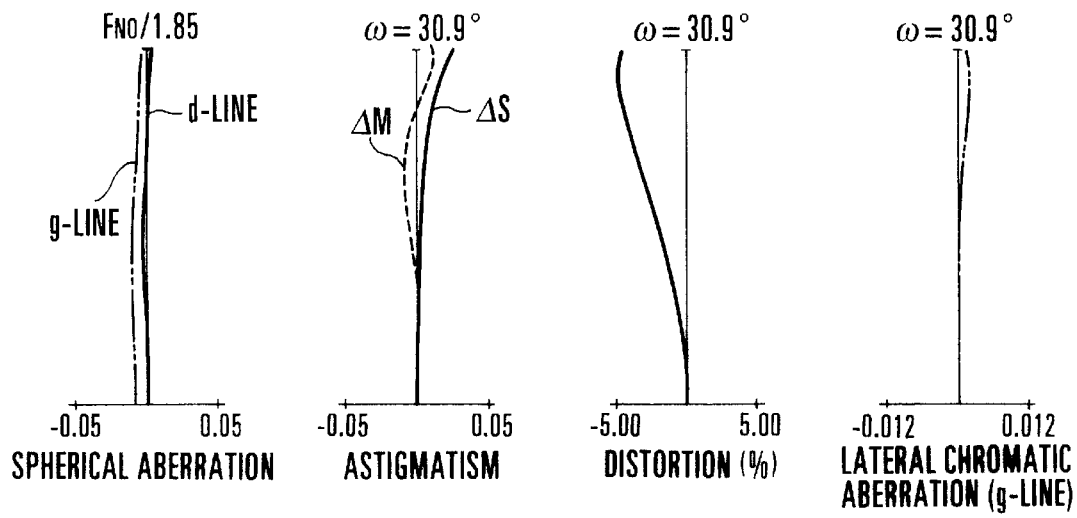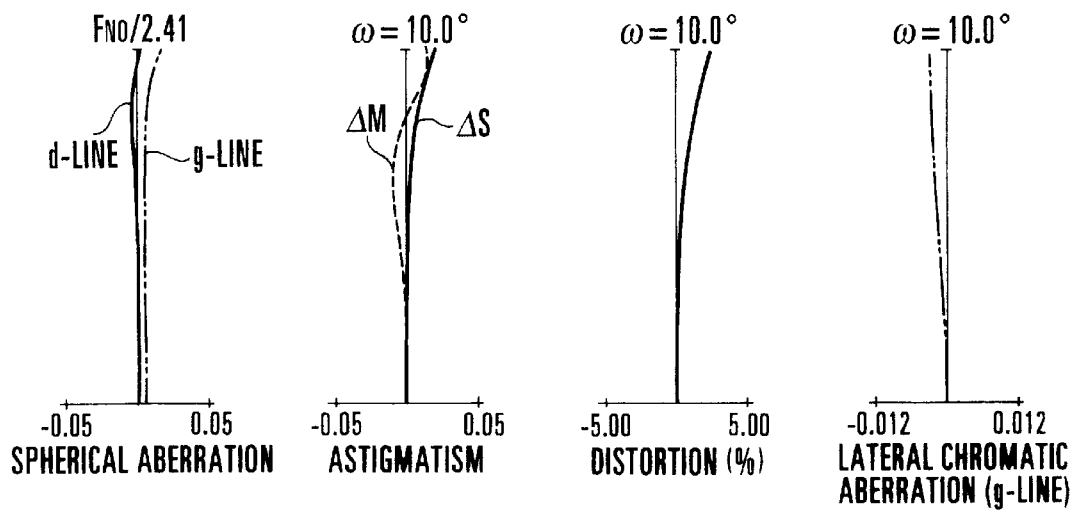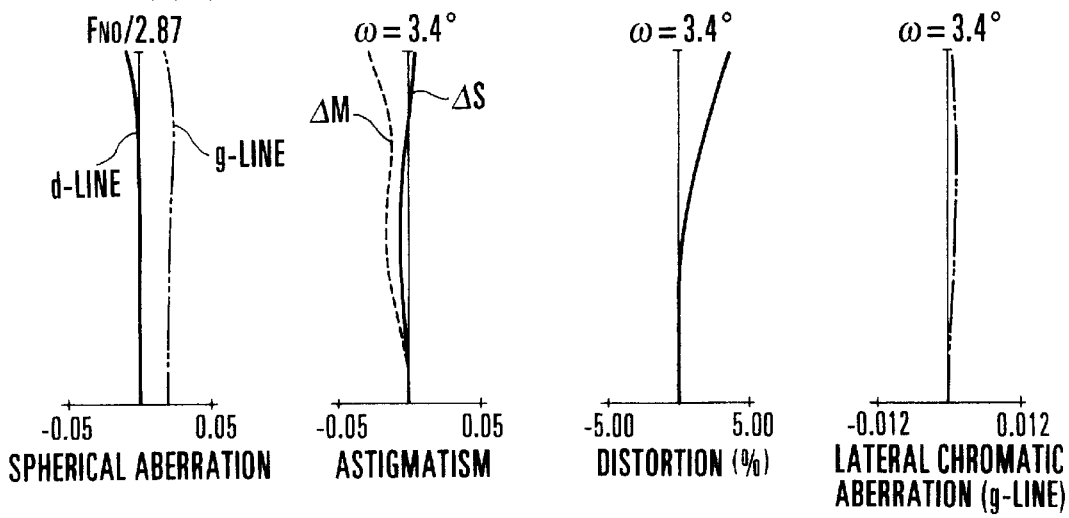

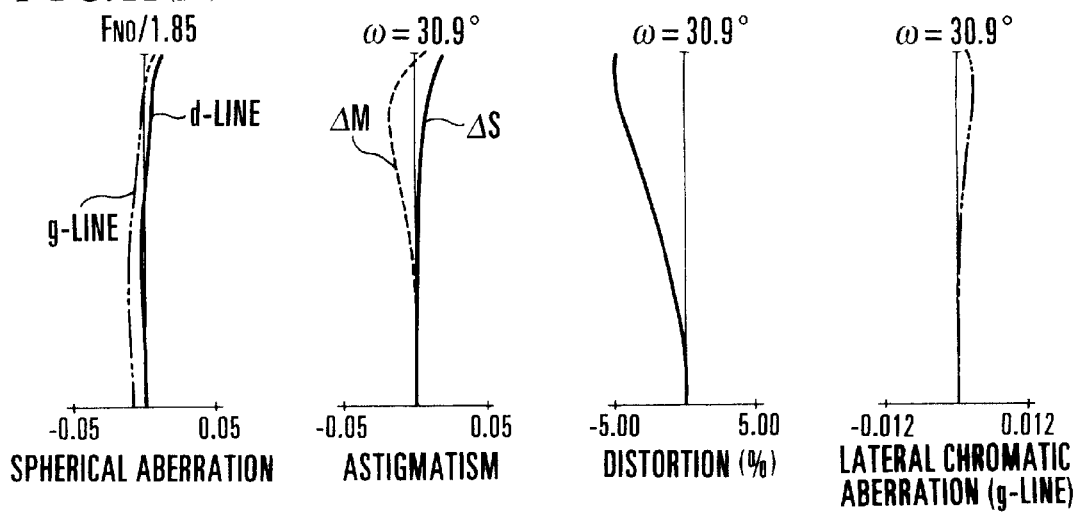
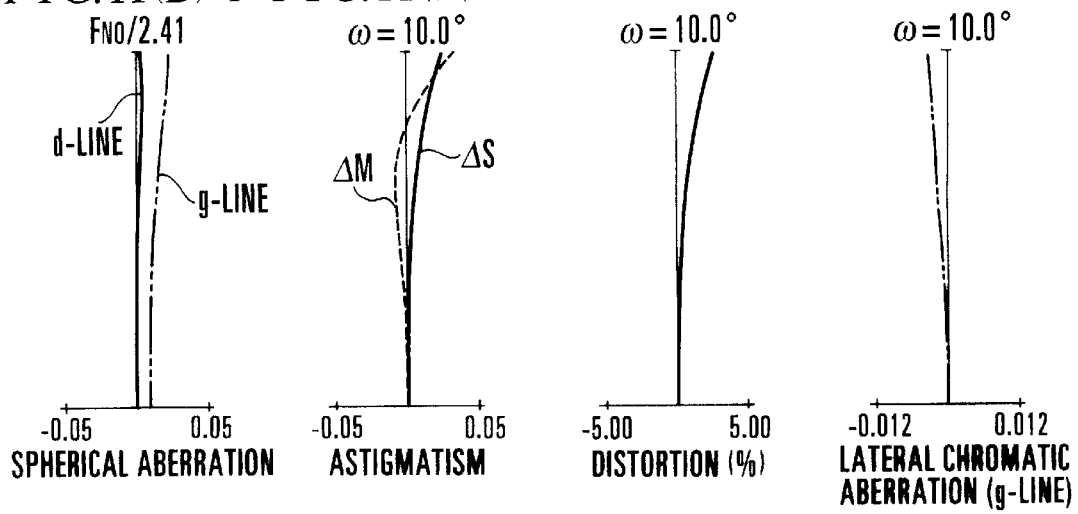
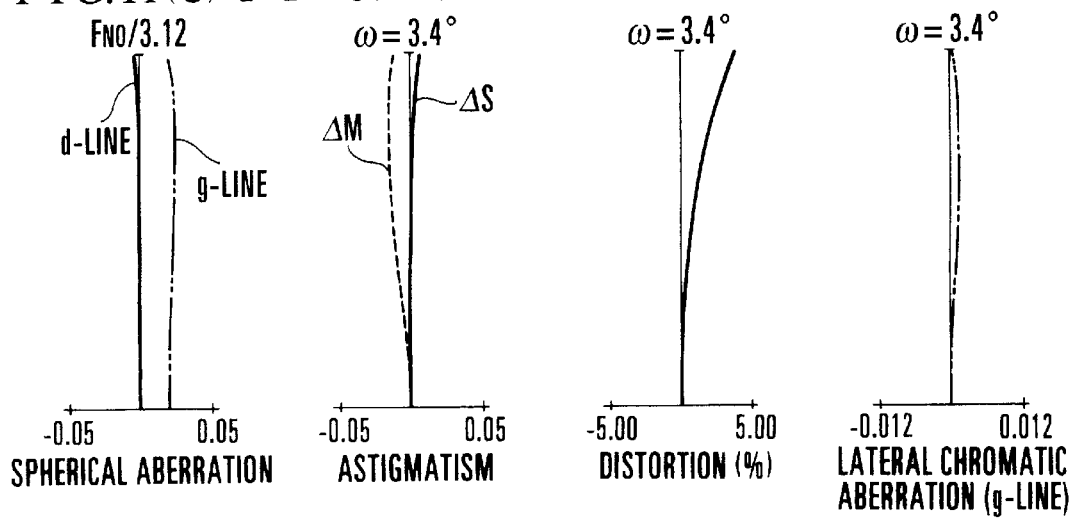

ZOOM LENS OF REAR FOCUS TYPE

This application is a continuation of application Ser. No. 08/653,196 filed May 24, 1996, now abandoned.

BACKGROUND OF THE INVENTION

1. Field of the Invention

This invention relates to zoom lenses of the rear focus type and, more particularly, to a high-range, large relative aperture zoom lens of the rear focus type whose variable magnification ratio is about 10 and whose F-number is about 1.8 at the wide-angle end, which is adapted for use in photographic cameras, video cameras or broadcasting cameras.

2. Description of the Related Art

For use in photographic cameras or video cameras, there have been many previous proposals for zoom lenses of a type in which a lens unit other than the front or first lens unit is made movable to effect focusing, i.e., of the so-called "rear focus" type.

In general, as compared with a zoom lens whose first lens unit is moved to effect focusing, a zoom lens of the rear focus type has such advantages that the effective diameter of the first lens unit becomes smaller so as to easily improve the compact form of the entire lens system, that a close-up photography, particularly, a supershort focusing, can be performed with ease, and further that, since a lens unit to be used for focusing is smaller in size and lighter in weight, a weaker driving torque suffices for moving the lens unit and a rapid focus adjustment, therefore, can be performed.

Such a zoom lens of the rear focus type is disclosed in, for example, Japanese Laid-Open Patent Applications Nos. Sho 62-24213 and Sho 62-247316, in which the zoom lens comprises, in order from an object side, a first lens unit of positive refractive power, a second lens unit of negative refractive power, a third lens unit of positive refractive power and a fourth lens unit of positive refractive power, totalling four lens units, the second lens unit is moved to vary magnification, and the fourth lens unit is moved to compensate for the image shift caused by the variation of magnification and to effect focusing.

In Japanese Laid-Open Patent Application No. Hei 4-43311, a zoom lens comprises, in order from an object side, a first lens unit of positive refractive power, a second lens unit of negative refractive power, a third lens unit of positive refractive power and a fourth lens unit of positive refractive power, wherein the third lens unit is constructed with a positive lens and a negative lens in the form of the telephoto type, thus shortening the overall length of the third and fourth lens units.

In another Japanese Laid-Open Patent Application No. Hei 4-301612, a zoom lens comprises, in order from an object side, a first lens unit of positive refractive power, a second lens unit of negative refractive power, a third lens unit of positive refractive power, a fourth lens unit of positive refractive power and a fifth lens unit of negative refractive power, the second and fourth lens units being moved to vary magnification and the fourth lens unit being moved to effect focusing, wherein the overall length of the third, fourth and fifth lens units is shortened owing to the use of the negative fifth lens unit.

In most cases, the use of the rear focus type in the zoom lens produces the outstanding advantages described before. That is, the entirety of the lens system is minimized in bulk and size. Rapid focusing becomes possible. Further, a close-up photography becomes easier to do.

Concerning a zoom lens comprising, in order from an object side, a first lens unit of positive refractive power, a second lens unit of negative refractive power, a third lens unit of positive refractive power and a fourth lens unit of positive refractive power, if it is attempted to shorten the overall length of the third and fourth lens units by increasing a refractive power of the third lens unit, the amount of movement of the fourth lens unit during focusing or during variation of magnification becomes too large. For an object at the minimum distance, therefore, a problem arose in that, as zooming to the intermediate region of focal lengths, the third and fourth lens units mechanically interfere with each other. Thus, the air separation between the third and fourth lens units has to be widened greatly, and the total length is caused to become rather longer.

The zoom lens disclosed in Japanese Laid-Open Patent Application No. Hei 4-301612 is a 5-unit one in which a stationary negative lens is additionally provided on the image side of the four lens units. In this case, the third to fourth lens units are formed to the telephoto type, thereby shortening the total length of the entire lens system. However, because an aperture stop is located in between the second and third lens units, it is necessary to excessively widen the space where a light beam strongly diverges behind the second lens unit.

Also, this arrangement leads to an increase in the variation of aberrations during variation of magnification or during focusing. It is, therefore, very difficult to simultaneously fulfill the requirements of achieving improvements of the compact form and of maintaining a good stability of high optical performance throughout.

SUMMARY OF THE INVENTION

The invention employs the rear focusing method and is to greatly increase the relative aperture and the zooming range at once. An object of the invention is, therefore, to provide a zoom lens of the rear focus type with the total length of the entire system shortened to improve the compact form, while still permitting a good stability of optical performance to be maintained at a high level throughout the entire zooming range and throughout the entire focusing range.

A zoom lens according to the invention comprises, in order from an object side to an image side, a first lens unit having a positive refractive power, a second lens unit having a negative refractive power, a third lens unit having a positive refractive power, a fourth lens unit having a positive refractive power and a fifth lens unit having a negative refractive power, wherein at least the second and fourth lens units are moved to vary magnification and the fourth lens unit is moved to effect focusing, and wherein an aperture stop is located in a space between the third and fourth lens units.

These and other objects and features of the invention will become apparent from the following detailed description of preferred embodiments thereof taken by reference to the accompanying drawings:

BRIEF DESCRIPTION OF THE DRAWINGS

FIGS. 4(A)-1 to 4(A)-4, FIGS. 4(B)-1 to 4(B)-4 and FIGS. 4(C)-1 to 4(C)-4 are graphic representations of the aberrations of the zoom lens of the numerical example 1.

FIGS. 5(A)-1 to 5(A)-4, FIGS. 5(B)-1 to 5(B)-4 and FIGS. 5(C)-1 to 5(C)-4 are graphic representations of the aberrations of the zoom lens of the numerical example 2.

FIGS. 6(A)-1 to 6(A)-4, FIGS. 6(B)-1 to 6(B)-4 and FIGS. 6(C)-1 to 6(C)-4 are graphic representations of the aberrations of the zoom lens of the numerical example 3.

FIGS. 7(A)-1 to 7(A)-4, FIGS. 7(B)-1 to 7(B)-4 and FIGS. 7(C)-1 to 7(C)-4 are graphic representations of the aberrations of the zoom lens of the numerical example 4.

FIGS. 9(A)-1 to 9(A)-4, FIGS. 9(B)-1 to 9(B)-4 and FIGS. 9(C)-1 to 9(C)-4 are graphic representations of the aberrations of the zoom lens of the numerical example 5.

FIGS. 10(A)-1 to 10(A)-4, FIGS. 10(B)-1 to 10(B)-4 and FIGS. 10(C)-1 to 10(C)-4 are graphic representations of the aberrations of the zoom lens of the numerical example 6.

FIGS. 11(A)-1 to 11(A)-4, FIGS. 11(B)-1 to 11(B)-4 and FIGS. 11(C)-1 to 11(C)-4 are graphic representations of the aberrations of the zoom lens of the numerical example 7.

In the diagrams, I denotes the first lens unit, II the second lens unit, III the third lens unit, IV the fourth lens unit and V the fifth lens unit.

In the graphs, $\Delta M$ stands for the meridional image focus, $\Delta S$ for the sagittal image focus, d for the spectral d-line and g for the spectral g-line.

DETAILED DESCRIPTION OF THE PREFERRED EMBODIMENTS

Figure 1:
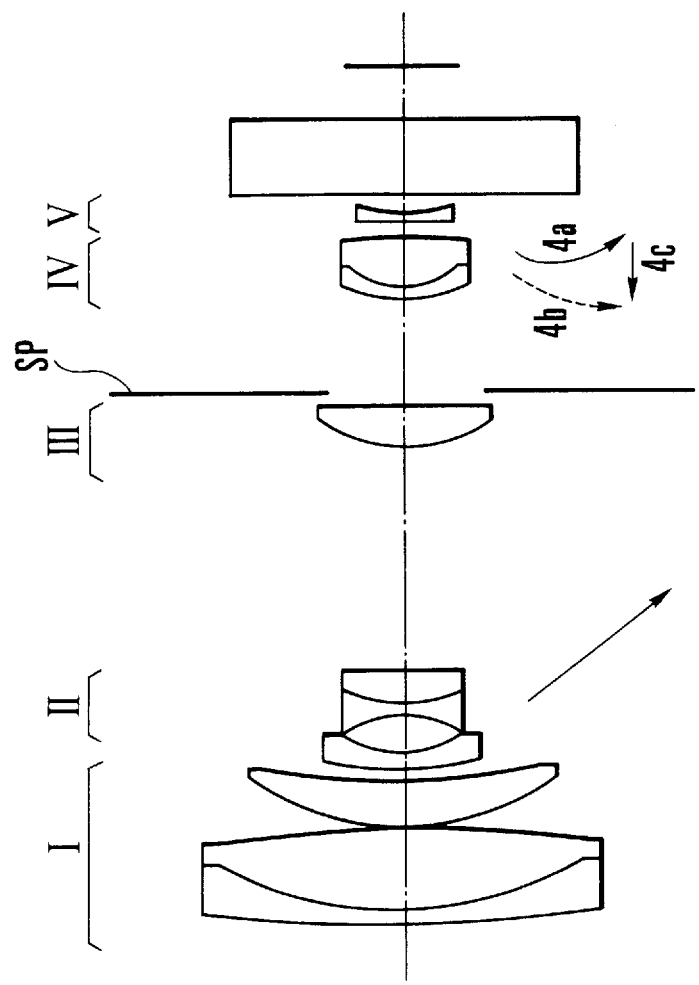
FIG. 1 is a lens block diagram of numerical examples 1 and 2 of the invention.
Figure 2:
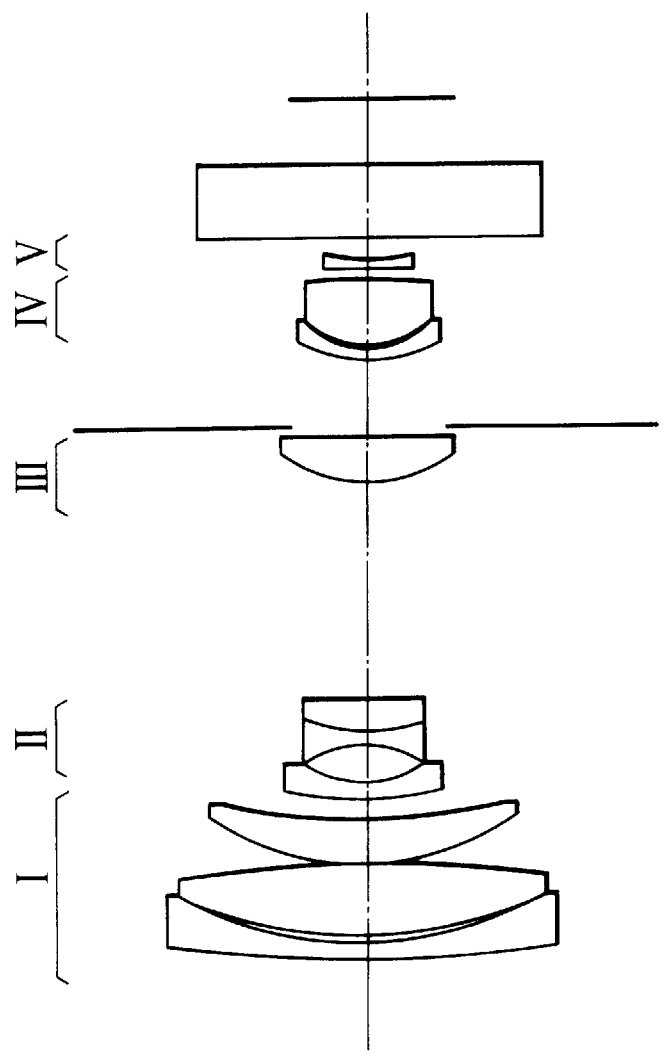
FIG. 2 is a lens block diagram of a numerical example 3 of the invention.
Figure 3:
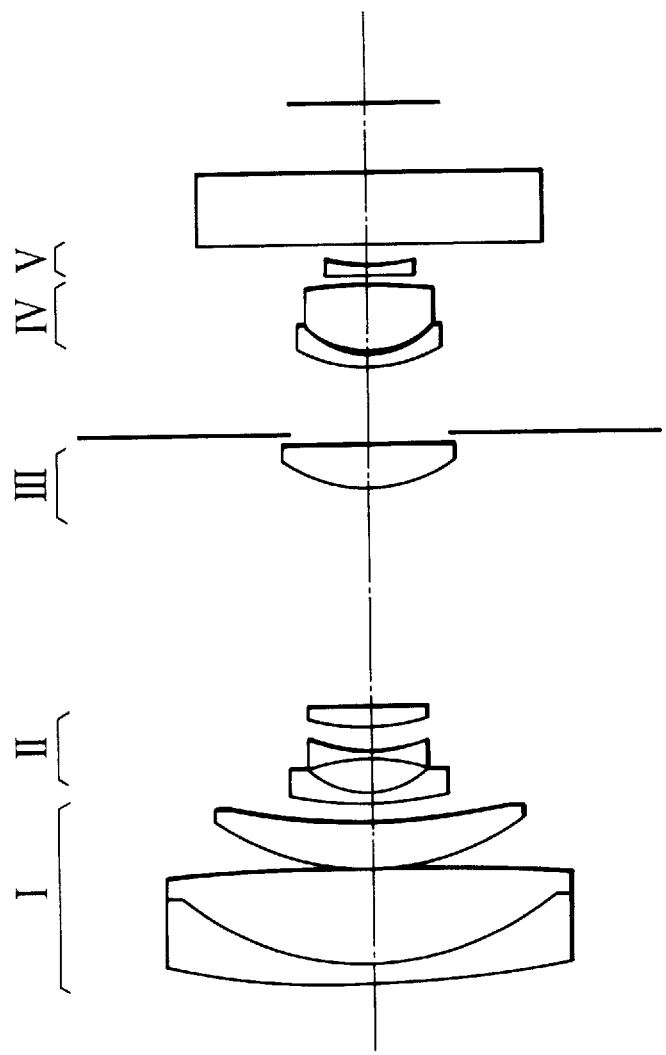
FIG. 3 is a lens block diagram of a numerical example 4 of the invention.

FIG. 1 is a longitudinal section view showing the numerical examples 1 and 2 of zoom lenses of the invention, in which roman numeral I denotes the first lens unit of positive refractive power, roman numeral II denotes the second lens unit of negative refractive power, roman numeral III denotes the third lens unit of positive refractive power, roman numeral IV denotes the fourth lens unit of positive refractive power and roman numeral V denotes the fifth lens unit of negative refractive power. Of the graphic representations, the ones of each figure number with suffix (A), (B) or (C) show the aberrations in the wide-angle end, an intermediate focal length position, or the telephoto end, respectively.

During variation of magnification from the wide-angle end to the telephoto end, at least the second lens unit is moved toward the image side as shown by the arrow, while the fourth lens unit is simultaneously moved to compensate for the shift of an image plane caused by the variation of magnification.

Further, the fourth lens unit is moved along an optical axis to effect focusing, as the rear focus type is employed. For an object at infinity, or the minimum distance, according to the variation of magnification from the wide-angle end to the telephoto end, the fourth lens unit is moved to compensate for the image shift along a locus shown by a solid line curve 4a, or a dashed line curve 4b, respectively, in FIG. 1.

It is to be noted that the first, third and fifth lens units remain stationary during variation of magnification and during focusing.

Further, it is to be noted that at least the first lens unit may be also moved in order to lessen the duty of varying magnification that the second lens unit bears.

In the present embodiment, it is the fourth lens unit that is given not only the function of compensating for the image shift with zooming but also the focusing function. In particular, as shown by the curves 4a and 4b in FIG. 1, the loci of motion of the fourth lens unit are made convex toward the object side during variation of magnification from the wide-angle end to the telephoto end. This assures efficient utilization of the air space between the third lens unit and the fourth lens unit, thus achieving a shortening of the total length of the entire lens system advantageously.

In the present embodiment, with the setting, for example, in the telephoto end, when focusing from an infinitely distant object to closer objects, the fourth lens unit is moved forward as shown by a straight line 4c in FIG. 1.

Further, an aperture stop SP for determining the F-number, which would be located in the space between the second and third lens units according to the prior art, is located in the space between the third and fourth lens units according to the invention. This leads to efficient utilization of the space, thus reducing the curvature of field from that which would be otherwise produced due to the increase of the Petzval sum when the overall length of the third to fifth lens units is shortened.

An explanation about this utilization of the space will be made in more detail below. To achieve minimization of the size of the zoom lens, it is necessary to decrease the total amount of movement of the second lens unit during variation of magnification by strengthening a negative refractive power of the second lens unit so far as the problem of aberration correction permits. In turn, this causes the divergence of the light bundle from the second lens unit to become stronger. Therefore, in order to shorten the overall physical length of the third to fifth lens units, it is effective to reduce the interval between the principal points of the second and third lens units. On the contrary, according to the prior art, the aperture stop is located in between the second and third lens units and, therefore, it is necessary to secure some space for installation of a mechanism for the aperture stop there. In this instance, if it is intended to forcibly shorten the overall physical length of the third to fifth lens units, a necessity arises for increasing the telephoto ratio to even higher a value. To this purpose, a refractive power of the negative fifth lens unit must be made so much stronger. Hence, the Petzval sum of the entire lens system which has increased due to the strengthening of the refractive power of the second lens unit is further increased in the negative sense. As a result, it becomes difficult to correct sagittal field curvature.

On this account, according to the invention, the aperture stop is positioned in the space between the third and fourth lens units, to allow for reduction of the separation between the second and third lens units. In turn, the space between the third and fourth lens units is widened to lessen the negative increase of the Petzval sum resulting from the decrease of the distance from the third lens unit to the image plane. The field curvature is thus corrected well when the total length of the entire lens system is shortened.

Specifically, according to the invention, the following condition is satisfied as to a relationship between an air separation $D_{23}$ between a lens surface nearest to the image side of the second lens unit and a lens surface nearest to the object side of the third lens unit for an infinitely distant object in the telephoto end and a focal length $f_W$ of the entire zoom lens:

$$0.04 < D_{23}/f_W < 0.21 \ldots \qquad (1)$$

This condition gives an appropriate range for the separation between the second and third lens units to facilitate the shortening of the total length of the complete zoom lens.

When the separation between the second and third exceeds the upper limit of the inequalities of condition (1), it becomes difficult to shorten the overall physical length of the third to fifth lens units. Conversely, when the lower limit is exceeded, the possibility of the lenses colliding each other at a time of tracking adjustment or the like increases objectionably.

Also, according to the invention, the distance $D_S$ between a lens surface nearest to the image side of the third lens unit and the aperture stop in the wide-angle end falls in the following range:

$$0.11 < D_S/f_W < 0.45 \ldots \qquad (2)$$

The shortening of the total length of the complete zoom lens is thus effectively performed without affecting the operation of the diaphragm blades of the aperture stop.

When the upper limit of the inequalities of condition (2) is exceeded, as this means that the separation between the third lens unit and the aperture stop is too long, the distance from the front vertex of the first lens unit to the entrance pupil becomes longer, thereby causing the diameter of the front lens members to increase objectionably.

Conversely, when the lower limit is exceeded, the lens surface and the aperture stop become so close to each other as to produce a possibility of occurrence of the mechanical interference of the aperture stop with the lens surface when the diaphragm blades are taken out of flatness, or like accident occurs. So, it should be avoided.

For a more desired result, in the present embodiment, a magnification $\beta_5$ for an infinitely distant object of the fifth lens unit is determined so as to satisfy the following condition:

$$1.2 < \beta_5 < 2.0 \ldots \qquad (3)$$

The optical performance is thus preserved while shortening the total length of the complete zoom lens.

When the magnification of the fifth lens unit is smaller than the lower limit of the inequalities of condition (3), the effect of sufficiently shortening the total length of the complete zoom lens cannot be obtained.

Conversely, when the magnification is greater than the upper limit, this is favorable to the shortening of the total length of the complete zoom lens, but the Petzval sum increases in the negative sense so greatly that the field curvature becomes difficult to correct and that the telecentric nature considerably collapses. This is hardly suited to the video camera or the like.

To shorten the overall length of the third to fifth lens units, while still permitting the optical performance to be kept at a certain level, it is preferable to satisfy the following condition:

$$2.1 < f_3/f_W < 3.4 \ldots \qquad (4)$$

where $f_3$ is a focal length of the third lens unit, and $f_W$ is a focal length in the wide-angle end of the entire zoom lens.

The inequalities of condition (4) give a proper range for the focal length of the third lens unit. When the lower limit is exceeded, as this means that the refractive power of the third lens unit is too strong, it is in some cases that insufficient correction of spherical aberration and coma results. In other cases, it becomes difficult to secure the back focal distance.

Conversely, when the upper limit is exceeded, an insufficient shortening of the total length of the complete zoom lens results.

Further, in the present embodiment, the shortening of the overall length of the third to fifth lens units is relied on the minimization of the movement of the fourth lens unit. In this respect, it is preferable to satisfy the following condition:

$$1.5 < f_4/f_W < 3.1 \ldots \qquad (5)$$

where $f_4$ is a focal length of the fourth lens unit.

The inequalities of condition (5) give a proper range for the focal length of the fourth lens unit. When the lower limit is exceeded, as this means that the refractive power of the fourth lens unit is too strong, a large variation of spherical aberration during variation of magnification results. Conversely, when the upper limit is exceeded, the movement of the fourth lens unit becomes so much longer that a sufficient effect of shortening the total length of the complete zoom lens is not produced due to the necessity for widening the air separation between the third and fourth lens units.

Also, in the zoom lens of the present embodiment, the shortening of the lens length of a zoom section contributes to a further shortening of the total length of the complete zoom lens. To this purpose, it is preferable to satisfy the following condition:

$$0.2 < |f_2/\sqrt{f_W \cdot f_T}| < 0.3 \qquad (6)$$

where $f_2$ is a focal length of the second lens unit, and $f_T$ is a focal length in the telephoto end of the entire zoom lens.

The inequalities of condition (6) are concerned with the refractive power of the second lens unit and have an aim to obtain a predetermined variable magnification ratio advantageously in such a manner that the aberrations are maintained stable against zooming.

When the lower limit is exceeded, as this means that the refractive power of the second lens unit is too strong, the compact form of the entire lens system becomes easy to improve, but the Petzval sum increases in the negative direction. So, large field curvature results. Moreover, the variation of aberrations with zooming becomes greater. When the refractive power of the second lens unit is too weak as exceeding the upper limit, the stability of aberrations becomes better throughout the entire variable magnification range, but the required total zooming movement for producing the predetermined variable magnification ratio increases, thereby increasing the total length of the complete zoom lens objectionably.

The conditions described above suffice for achieving the zoom lens of the present embodiment. However, it is of importance to reduce the thickness of every lens unit itself when to shorten the total length of the complete zoom lens.

Accordingly, in the present embodiment, the number of lens elements is reduced. For this purpose, aspheric surfaces are preferably introduced to some of the lens units, particularly, the third and fourth lens units.

In particular, it is preferable that the third lens unit is constructed in the form of a single lens having at least one aspheric surface and the fourth lens unit is constructed with a negative meniscus lens and a positive lens, totaling two lenses.

For the first lens unit, it is also preferable that a negative lens of the first lens unit is made up by using a glass material whose Abbe number $\nu_{1N}$ lies within the following range:

$$\nu_{1N} < 23$$

By this, the achromatic effect is enhanced to allow for reduction of the thicknesses of positive lenses of the first lens unit.

The first lens unit is, as a rule, constructed with a plus-minus cemented lens and a positive meniscus lens. As shown in the numerical example 3, however, the cemented lens may be made up in broken contact. The resulting air space between its positive and negative lenses shifts the rear principal point of the first lens unit toward the second lens unit, thereby reducing the interval between the first and second lens units. Even with this, when to increase the maximum field angle, it is also possible to suppress the resultant increase of the diameter of the front lens members to a minimum, provided that the real separation between the first and second lens unit is kept to be the same.

Also, as shown in the numerical example 4, the negative cemented lens of the second lens unit may be divided into two lenses or negative and positive lenses to increase the degree of freedom on the aberration correction.

Next, the numerical examples 1 to 4 of the invention are shown. In the data for the numerical examples 1 to 4, Ri is the radius of curvature of the i-th lens surface, when counted from the object side, Di is the i-th axial thickness or air separation, when counted from the object side, and Ni and vi are respectively the refractive index and Abbe number of the glass of the i-th lens element when counted from the object side.

The values of the factors in the above-described conditions (1) to (6) for the numerical examples 1 to 4 are listed in Table-1.

It is to be noted in the numerical examples 1 to 4 that the last two surfaces define a face plate or like glass material.

The shape of the aspheric surface is expressed in the coordinates with an X axis in the axial direction and an H axis in the direction perpendicular to the optical axis, the direction in which light advances being taken as positive, by the following equation:

$$X = \frac{(1/R_0)H^2}{1 + \sqrt{1 - (1+K)(H/R_0)^2}} + BH^4 + CH^6 + DH^8 + EH^{10}$$

where $R_0$ is the radius of the osculating sphere, and K, B, C, D and E are the aspheric coefficients.

In the values of the aspheric coefficients, the notation "e-0X" means $10^{-X}$.

NUMERICAL EXAMPLE 1

| | | |
|---|---|---|
| f = 1–10.00 | Fno = 1.85–2.92 | 2ω = 61.7°–6.8° |
| R 1 = 18.690 | D 1 = 0.17 | N 1 = 1.922862 v 1 = 20.9 |
| R 2 = 4.029 | D 2 = 0.96 | N 2 = 1.804000 v 2 = 46.6 |
| R 3 = −14.339 | D 3 = 0.04 | |
| R 4 = 3.086 | D 4 = 0.47 | N 3 = 1.834000 v 3 = 37.2 |
| R 5 = 6.498 | D 5 = Variable | |
| R 6 = 5.981 | D 6 = 0.12 | N 4 = 1.882997 v 4 = 40.8 |
| R 7 = 1.016 | D 7 = 0.46 | |
| R 8 = −1.218 | D 8 = 0.12 | N 5 = 1.719995 v 5 = 50.3 |
| R 9 = 1.422 | D 9 = 0.46 | N 6 = 1.846659 v 6 = 23.8 |
| R10 = −7.075 | D10 = Variable | |
| R11 = *1.644 | D11 = 0.48 | N 7 = 1.583126 v 7 = 59.4 |
| R12 = 73.171 | D12 = 0.24 | |
| R13 = Stop | D13 = 1.04 | |
| R14 = 1.627 | D14 = 0.12 | N 8 = 1.922862 v 8 = 20.9 |
| R15 = 0.947 | D15 = 0.60 | N 9 = 1.669100 v 9 = 55.4 |
| R16 = *−4.871 | D16 = Variable | |
| R17 = *−9.100 | D17 = 0.12 | N10 = 1.693501 v10 = 53.2 |
| R18 = *3.575 | D18 = 0.18 | |
| R19 = ∞ | D19 = 0.85 | N11 = 1.516330 v11 = 64.2 |
| R20 = ∞ | | |

| Variable | Focal Length | | |
|---|---|---|---|
| Separations | 1.00 | 4.94 | 10.00 |
| D 5 | 0.18 | 2.10 | 2.64 |
| D10 | 2.61 | 0.69 | 0.15 |
| D13 | 1.04 | 0.57 | 1.04 |
| D16 | 0.20 | 0.66 | 0.20 |

Aspheric Coefficients:

| | | | |
|---|---|---|---|
| R11: | K = −1.45427e+00 | B = 8.91569e−03 | C = −4.15132e−03 |
| | D = 7.13161e−03 | E = −3.44434e−03 | |
| R16: | K = −8.98929e+01 | B = −2.02245e−02 | C = 9.71386e−02 |
| | D = −1.70265e−01 | E = 1.40666e−01 | |
| R17: | K = −8.05849e+01 | B = 5.51375e−02 | C = 2.95819e−02 |
| R18: | K = −4.60478e+01 | B = 1.59286e−01 | C = 6.72773e−02 |
| | D = −1.81626e−02 | | |

(*: Aspheric surface)

NUMERICAL EXAMPLE 2

| | | |
|---|---|---|
| f = 1–10.00 | Fno = 1.85–2.96 | 2ω = 61.7°–6.8° |
| R 1 = 11.494 | D 1 = 0.17 | N 1 = 1.846659 v 1 = 23.8 |
| R 2 = 3.664 | D 2 = 1.05 | N 2 = 1.696797 v 2 = 55.5 |
| R 3 = −19.061 | D 3 = 0.04 | |
| R 4 = 3.067 | D 4 = 0.53 | N 3 = 1.804000 v 3 = 46.6 |
| R 5 = 7.666 | D 5 = Variable | |
| R 6 = 6.899 | D 6 = 0.12 | N 4 = 1.882997 v 4 = 40.8 |
| R 7 = 0.916 | D 7 = 0.48 | |
| R 8 = −1.179 | D 8 = 0.12 | N 5 = 1.603112 v 5 = 60.7 |
| R 9 = 1.469 | D 9 = 0.42 | N 6 = 1.846659 v 6 = 23.8 |
| R10 = −18.570 | D10 = Variable | |
| R11 = *1.443 | D11 = 0.54 | N 7 = 1.583126 v 7 = 59.4 |
| R12 = 14.480 | D12 = 0.17 | |
| R13 = Stop | D13 = 0.75 | |
| R14 = 1.605 | D14 = 0.12 | N 8 = 1.922862 v 8 = 20.9 |
| R15 = 0.906 | D15 = 0.77 | N 9 = 1.669100 v 9 = 55.4 |
| R16 = *−3.936 | D16 = Variable | |
| R17 = −9.235 | D17 = 0.12 | N10 = 1.669100 v10 = 55.4 |
| R18 = *2.700 | D18 = 0.18 | |
| R19 = ∞ | D19 = 0.85 | N11 = 1.516330 v11 = 64.2 |
| R20 = ∞ | | |

| Variable | Focal Length | | |
|---|---|---|---|
| Separations | 1.00 | 3.11 | 10.00 |
| D 5 | 0.17 | 1.59 | 2.53 |
| D10 | 2.46 | 1.04 | 0.15 |
| D13 | 0.75 | 0.36 | 0.75 |
| D16 | 0.17 | 0.56 | 0.17 |

Aspheric Coefficients:

| | | | |
|---|---|---|---|
| R11: | K = −2.31116e+00 | B = 4.83193e−02 | C = −4.74943e−03 |
| R16: | K = −3.07809e+01 | B = 4.77650e−02 | C = −7.49379e−03 |
| R18: | K = −6.41600e+01 | B = 2.59340e−01 | C = −2.45854e−01 |
| | D = 2.99765e−02 | | |

(*: Aspheric surface)

NUMERICAL EXAMPLE 3

| | | |
|---|---|---|
| f = 1–10.00 | Fno = 1.85–3.10 | 2ω = 61.7°–6.8° |
| R 1 = 16.869 | D 1 = 0.17 | N 1 = 1.846659 v 1 = 23.8 |
| R 2 = 4.043 | D 2 = 0.04 | |
| R 3 = 4.223 | D 3 = 0.91 | N 2 = 1.696797 v 2 = 55.5 |
| R 4 = −13.739 | D 4 = 0.04 | |
| R 5 = 3.050 | D 5 = 0.54 | N 3 = 1.804000 v 3 = 46.6 |
| R 6 = 8.666 | D 6 = Variable | |
| R 7 = 7.481 | D 7 = 0.12 | N 4 = 1.882997 v 4 = 40.8 |
| R 8 = 0.965 | D 8 = 0.48 | |
| R 9 = −1.187 | D 9 = 0.12 | N 5 = 1.603112 v 5 = 60.7 |
| R10 = 1.528 | D10 = 0.42 | N 6 = 1.846659 v 6 = 23.8 |
| R11 = −34.635 | D11 = Variable | |
| R12 = *1.430 | D12 = 0.54 | N 7 = 1.583126 v 7 = 59.4 |
| R13 = 14.198 | D13 = 0.17 | |
| R14 = Stop | D14 = 0.72 | |
| R15 = 1.662 | D15 = 0.12 | N 8 = 1.922862 v 8 = 20.9 |
| R16 = 0.954 | D16 = 0.00 | |
| R17 = *0.950 | D17 = 0.76 | N 9 = 1.669100 v 9 = 55.4 |
| R18 = *−3.568 | D18 = Variable | |

-continued

| | | | |
|---|---|---|---|
| R19 = −10.330 | D19 = 0.12 | N10 = 1.669100 | ν10 = 55.4 |
| R20 = *2.322 | D20 = 0.18 | | |
| R21 = ∞ | D21 = 0.85 | N11 = 1.516330 | ν11 = 64.2 |
| R22 = ∞ | | | |

| Variable | Focal Length | | |
|---|---|---|---|
| Separations | 1.00 | 3.11 | 10.00 |
| D 6 | 0.17 | 1.59 | 2.53 |
| D11 | 2.46 | 1.04 | 0.10 |
| D14 | 0.72 | 0.34 | 0.72 |
| D18 | 0.17 | 0.55 | 0.17 |

Aspheric Coefficients:

| | | | |
|---|---|---|---|
| R12: | K = −1.36277e+00 | B = 1.70026e−02 | C = 5.08443e−04 |
| R17: | K = −2.02067e−03 | B = −3.69901e−02 | C = 1.18705e−02 |
| R18: | K = −1.84083e+01 | B = 1.52775e−02 | C = 2.53454e−02 |
| R20: | K = −4.11618e+01 | B = 3.02257e−01 | C = −3.40681e−01 |
| | D = 1.61989e−01 | | |

(*: Aspheric surface)

NUMERICAL EXAMPLE 4

| | | | |
|---|---|---|---|
| f = 1–9.99 | Fno = 1.85–2.86 | 2ω = 61.7°–6.8° | |
| R 1 = 12.939 | D 1 = 0.17 | N 1 = 1.846659 | ν 1 = 23.8 |
| R 2 = 3.198 | D 2 = 1.12 | N 2 = 1.772499 | ν 2 = 49.6 |
| R 3 = −34.756 | D 3 = 0.04 | | |
| R 4 = 3.098 | D 4 = 0.54 | N 3 = 1.834000 | ν 3 = 37.2 |
| R 5 = 7.669 | D 5 = Variable | | |
| R 6 = 7.434 | D 6 = 0.12 | N 4 = 1.772490 | ν 4 = 49.6 |
| R 7 = 0.938 | D 7 = 0.41 | | |
| R 8 = −1.654 | D 8 = 0.12 | N 5 = 1.696797 | ν 5 = 55.5 |
| R 9 = 2.011 | D 9 = 0.21 | | |
| R10 = 2.401 | D10 = 0.28 | N 6 = 1.846659 | ν 6 = 23.8 |
| R11 = 18.973 | D11 = Variable | | |
| R12 = *1.540 | D12 = 0.54 | N 7 = 1.583126 | ν 7 = 59.4 |
| R13 = 106.655 | D13 = 0.17 | | |
| R14 = Stop | D14 = 0.75 | | |
| R15 = 1.628 | D15 = 0.12 | N 8 = 1.922862 | ν 8 = 20.9 |
| R16 = 0.949 | D16 = 0.00 | | |
| R17 = *0.958 | D17 = 0.76 | N 9 = 1.669100 | ν 9 = 55.4 |
| R18 = *−3.722 | D18 = Variable | | |
| R19 = −4.758 | D19 = 0.12 | N10 = 1.669100 | ν10 = 55.4 |
| R20 = *3.071 | D20 = 0.18 | | |
| R21 = ∞ | D21 = 0.85 | N11 = 1.516330 | ν11 = 64.2 |
| R22 = ∞ | | | |

| Variable | Focal Length | | |
|---|---|---|---|
| Separations | 1.00 | 3.04 | 9.99 |
| D 5 | 0.17 | 1.59 | 2.53 |
| D11 | 2.46 | 1.04 | 0.10 |
| D14 | 0.75 | 0.41 | 0.76 |
| D18 | 0.17 | 0.52 | 0.17 |

Aspheric Coefficients:

| | | | |
|---|---|---|---|
| R12: | K = −1.27736e+00 | B = 9.21876e−03 | C = 1.00869e−03 |
| R17: | K = 4.28007e−02 | B = −2.40038e−02 | C = 1.08291e−02 |
| R18: | K = −3.57091e+01 | B = −1.56404e−03 | C = 6.45822e−02 |
| R20: | K = −6.28598e+01 | B = 1.76148e−01 | C = −1.28981e−01 |
| | D = −1.22038e−01 | | |

(*: Aspheric Surface)

TABLE 1

| | Numerical Example | | | |
|---|---|---|---|---|
| Condition | 1 | 2 | 3 | 4 |
| $D_{23}/f_W$ | 0.146 | 0.0976 | 0.0976 | 0.0976 |
| $D_S/f_W$ | 0.244 | 0.171 | 0.171 | 0.171 |
| $\beta_5$ | 1.446 | 1.494 | 1.554 | 1.557 |
| $f_3/f_W$ | 2.879 | 2.707 | 2.685 | 2.675 |
| $f_4/f_W$ | 2.347 | 2.248 | 2.184 | 2.211 |
| $\|f_2/\sqrt{f_W \cdot f_T}\|$ | 0.274 | 0.262 | 0.262 | 0.262 |

Another embodiment of the invention is described as improved over the embodiment described above.

Figure 8:
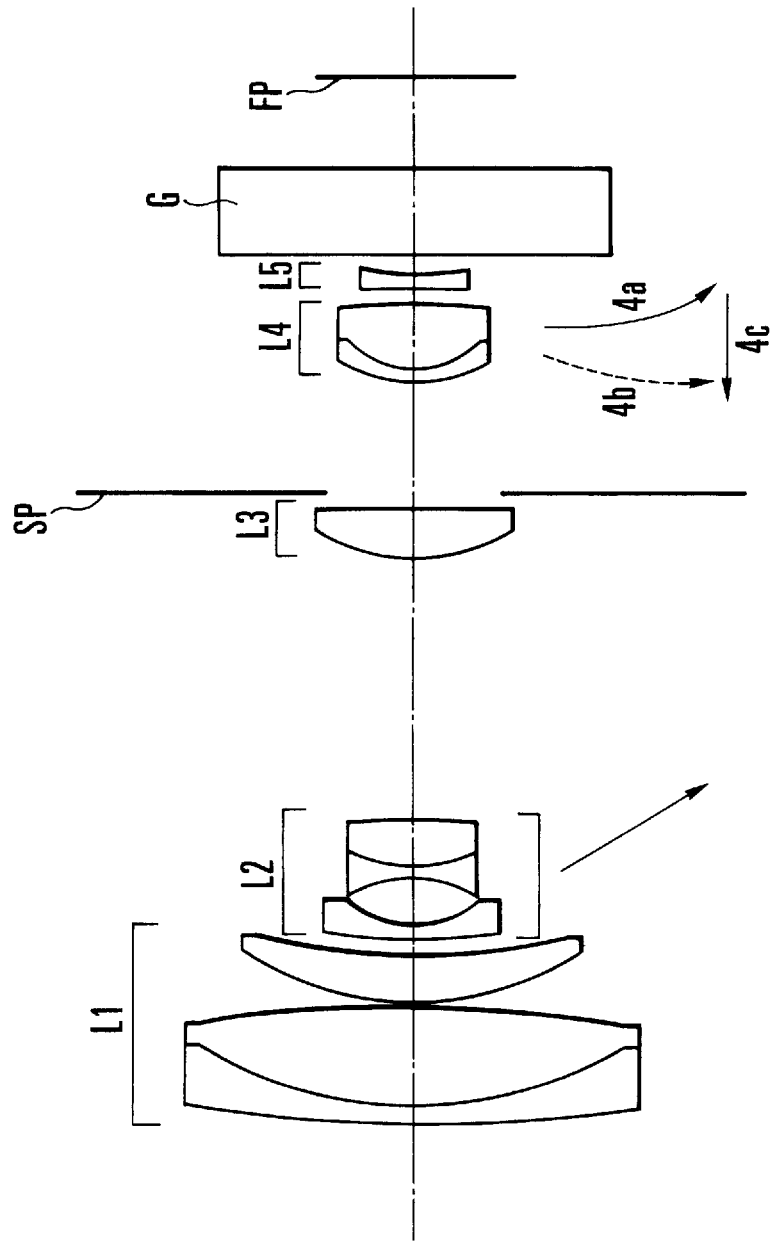
FIG. 8 is a lens block diagram of numerical examples 5 to 7 of the invention.

Referring to FIG. 8, a zoom lens comprises, in order from an object side, a first lens unit L1 of positive refractive power, a second lens unit L2 of negative refractive power, a third lens unit L3 of positive refractive power, a fourth lens unit L4 of positive refractive power and a fifth lens unit L5 of negative refractive power. An aperture stop SP is located in the space between the third lens unit L3 and the fourth lens unit L4. FP stands for the Focal Plane.

During variation of magnification from the wide-angle end to the telephoto end, the second lens unit is axially moved toward the image side as shown by the arrow, while the fourth lens unit is moved to compensate for the image shift caused by the variation of magnification. Focusing is performed by axially moving the fourth lens unit. That is, the rear focus type is employed.

A solid line curve 4a and a dashed line curve 4b for the fourth lens unit in FIG. 8 show the loci of motion required to compensate for the image shift during zooming with an object at infinity and the minimum distance, respectively. It is to be noted that the first, third and fifth lens units remain stationary during variation of magnification and during focusing.

In the present embodiment, as the fourth lens unit for compensating for the image shift with zooming is given also the focusing function, its zooming movement from the wide-angle end to the telephoto end is made, in particular, to depict a locus convex toward the object side as shown by the curves 4a and 4b in FIG. 8. The space between the third and fourth lens units is thus efficiently used to achieve a shortening of the total length of the complete zoom lens advantageously.

In the present embodiment, with the setting, for example, in the telephoto end, when focusing from an infinitely distant object to closer objects, the fourth lens unit is moved forward as shown by a straight line 4c in FIG. 8.

It should be noted in connection with the present embodiment that the first lens unit, too, may be made to move forward as zooming goes from the wide-angle end to the telephoto end. If so, the contribution of the second lens unit to the variation of the focal length is diminished to effect a favorable result on the aberration correction.

Then, in the present embodiment, a condition is set forth for the distance TD from the first lens surface nearest to the object side to a paraxial image plane, as follows:

$$0.8 \leq TD/f_T \leq 1.0 \ldots \quad (7)$$

where $f_T$ is a focal length in the telephoto end of the entire zoom lens.

The technical significance of the condition (7) is explained below.

If it is intended to shorten the total length of the complete zoom lens beyond the lower limit of the condition (7), too large a negative Petzval sum results, so that it becomes difficult to correct field curvature. Conversely, when the upper limit of the condition (7) is exceeded, the total length of the complete zoom lens becomes too long objectionably.

In the present embodiment, the aperture stop SP is located in the space between the third lens unit L3 and the fourth lens unit L4. Such an efficient utilization of the space permits minimization of the produced amount of field curvature which would otherwise increase due to the increase of the Petzval sum when the overall length of the third to fifth lens units is shortened.

An explanation will be made about this in more detail below. To achieve minimization of the size of the zoom lens, it is necessary to decrease the total zooming movement of the second lens unit by strengthening a negative refractive power of the second lens unit so far as the problem of aberration correction permits. However, such an increase of the negative refractive power of the second lens unit causes an increase of the divergence of the light bundle from the second lens unit. In order to shorten the overall length of the third to fifth lens units, therefore, it is found advantageous to reduce the interval between the principal points of the second and third lens units. If, as such a situation is unnoticed, the aperture stop is located in between, for example, the second and third lens units, it becomes necessary to create a space the aperture stop occupies between the second and third lens units.

In order to shorten the overall length of the third to fifth lens units under such a condition, the negative refractive power of the negative fifth lens unit has to be so much increased to increase the telephoto ratio to even higher a value. The Petzval sum of the entire lens system which has increased due to the strengthening of the refractive power of the second lens unit is then further increased in the negative sense. As a result, it becomes difficult to correct field curvature, particularly, the sagittal one.

On this account, according to the invention, the aperture stop SP is located in the space between the third and fourth lens units to allow for reduction of the separation between the second and third lens units. In turn, the space between the third and fourth lens units is widened to lessen the negative increase of the Petzval sum resulting from the decrease of the distance from the third lens unit to the image plane. The field curvature is thus corrected well when the total length of the complete zoom lens is shortened.

The invention has set forth the rules of design for the various parameters as described above to simultaneously fulfill the requirements of improving the compact form of the entire lens system and of correcting all aberrations well. To secure an even better optical performance, it is preferred to satisfy at least one of the following conditions:

(a1) An air separation $DT_{23}$ for the telephoto end between the second lens unit and the third lens unit falls within the following range:

$$0.05 < DT_{23}/f_W < 0.2 \ldots \tag{8}$$

where $f_W$ is a focal length in the wide-angle end of the entire zoom lens.

When the separation $DT_{23}$ is smaller than the lower limit of the condition (1), it will happen that, as the second lens unit is moved for adjusting or like purposes, it accidentally collides with the third lens unit. So, it should be avoided. Conversely, when the upper limit is exceeded, an insufficient shortening of the overall length of the third to fifth lens units results.

(a2) The first lens unit includes at least one negative lens satisfying the following conditions:

$$v_{1N} < 23 \ldots \tag{9}$$

$$1.85 < N_{1N} \ldots \tag{10}$$

where $N_{1N}$ and $v_{1N}$ are respectively a refractive index and an Abbe number of a material of the negative lens of the first lens unit.

By using the glass material that satisfies the conditions (9) and (10) in the negative lens of the first lens unit, the achromatic effect is enhanced to allow for reduction of the thicknesses of positive lenses included in the first lens unit. Moreover, the Petzval sum of the entire lens system is improved from increasing particularly in the negative direction to a large value.

(a3) The focal length $f_2$ of the second lens unit and the image forming magnification $\beta_5$ of the fifth lens unit lie within the following respective ranges:

$$0.2 < |f_2/\sqrt{f_W \cdot f_T}| < 0.3 \tag{11}$$

$$1.2 < \beta_5 < 2.0 \tag{12}$$

where $f_W$ and $f_T$ are focal lengths in the wide-angle end and the telephoto end of the entire zoom lens, respectively.

The inequalities of conditions (11) and (12) have aims chiefly to maintain a good stability of optical performance with the total length of the entire lens system shortened. Of these, the condition (11) gives a proper range for the refractive power of the second lens unit and is mainly to obtain a predetermined variable magnification ratio advantageously in such a manner that the variation of aberrations with zooming is minimized. When the lower limit is exceeded, as this means that the refractive power of the second lens unit is too strong, the compact form of the entire lens system becomes easy to improve, but the Petzval sum increases in the negative direction. So, large field curvature results. Moreover, the variation of aberrations with zooming gets larger. When the refractive power of the second lens unit is too weak as exceeding the upper limit, the stability of aberrations becomes better throughout the entire zooming range, but the required total zooming movement for producing the predetermined variable magnification ratio increases, thereby increasing the total length of the complete zoom lens objectionably.

The inequalities of condition (12) give a proper range for the image forming magnification of the fifth lens unit. When the image forming magnification of the fifth lens unit is smaller than the lower limit of the condition (12), the sufficient effect of shortening the total length of the complete zoom lens cannot be obtained. Conversely, when the image forming magnification is greater than the upper limit, this is favorable to the shortening of the total length of the complete zoom lens, but the Petzval sum increases in the negative sense so greatly that the field curvature becomes difficult to correct and that the telecentric nature considerably collapses. The resultant zoom lens is hardly applicable to the video camera or the like.

(a4) The total number of lens elements in the entire zoom lens is reduced to 10 or thereabound, while still permitting a good stability of optical performance to be maintained. To this purpose, at least one aspheric surface is preferably used in the third lens unit and/or the fourth lens unit. In particular, it is preferable that the third lens unit is constructed in the form of a single lens having at least one aspheric surface and the fourth lens unit is constructed with a negative meniscus lens and a positive lens, totaling two lenses.

(a5) The fifth lens unit is constructed in the form of a single negative lens whose both surfaces are concave. This is favorable to the shortening of the total length of the complete zoom lens and the correction of aberrations.

Next, the numerical examples 5 to 7 of the invention are shown. In the data for the numerical examples 5 to 7, Ri is the radius of curvature of the i-th lens surface, when counted from the object side, Di is the i-th axial thickness or air separation, when counted from the object side, and Ni and vi are respectively the refractive index and Abbe number of the glass of the i-th lens element, when counted from the object side. In the numerical examples 5 to 7, R19 and R20 show an optical filter, face plate or the like, which may be omitted as necessity arises.

The shape of the aspheric surface is expressed in the coordinates with an X axis in the axial direction and an H axis in the direction perpendicular to the optical axis, the direction in which light advances being taken as positive, by the following equation:

$$X = \frac{(1/R)H^2}{1+\sqrt{1-(1+K)(H/R)^2}} + BH^4 + CH^6 + DH^8 + EH^{10}$$

where R is the radius of the osculating sphere, and K, B, C, D and E are the aspheric coefficients.

In the values of the aspheric coefficients, the notation "e-0X" means $10^{-x}$.

The values of the factors in the above-described conditions (7) to (12) for the numerical examples 5 to 7 are listed in Table-2.

NUMERICAL EXAMPLE 5

| f = 1–10.00 | Fno = 1.85–3.03 | 2ω = 61.7°–6.8° | | |
|---|---|---|---|---|
| R 1 = 16.23 | D 1 = 0.17 | N 1 = 1.92307 | v 1 = 18.9 |
| R 2 = 4.10 | D 2 = 0.93 | N 2 = 1.78589 | v 2 = 44.2 |
| R 3 = –14.41 | D 3 = 0.04 | | |
| R 4 = 3.04 | D 4 = 0.47 | N 3 = 1.83400 | v 3 = 37.2 |
| R 5 = 6.49 | D 5 = Variable | | |
| R 6 = 6.32 | D 6 = 0.12 | N 4 = 1.88299 | v 4 = 40.8 |
| R 7 = 1.00 | D 7 = 0.46 | | |
| R 8 = –1.19 | D 8 = 0.12 | N 5 = 1.69679 | v 5 = 55.5 |
| R 9 = 1.44 | D 9 = 0.43 | N 6 = 1.84665 | v 6 = 23.8 |
| R10 = 8.86 | D10 = Variable | | |
| R11 = 1.57 | D11 = 0.48 | N 7 = 1.58312 | v 7 = 59.4 |
| R12 = 73.17 | D12 = 0.17 | | |
| R13 = (Stop) | D13 = Variable | | |
| R14 = 1.62 | D14 = 0.12 | N 8 = 1.92307 | v 8 = 18.9 |
| R15 = 0.97 | D15 = 0.60 | N 9 = 1.66910 | v 9 = 55.4 |
| R16 = –4.87 | D16 = Variable | | |
| R17 = –8.83 | D17 = 0.12 | N10 = 1.69350 | v10 = 53.2 |
| R18 = 3.53 | D18 = 0.18 | | |
| R19 = ∞ | D19 = 0.85 | N11 = 1.51633 | v11 = 64.2 |
| R20 = ∞ | | | |

| Variable Separations | Focal Length | | |
|---|---|---|---|
| | 1.00 | 4.98 | 10.00 |
| D 5 | 0.17 | 2.04 | 2.57 |
| D10 | 2.49 | 0.62 | 0.10 |
| D13 | 1.07 | 0.59 | 1.07 |
| D16 | 0.17 | 0.65 | 0.17 |

Aspheric Coefficients:

| R11: | K = –1.446e+00 | B = 1.002e–02 | C = –2.497e–03 |
|---|---|---|---|
| | D = 5.984e–03 | E = –2.711e–03 | |
| R16: | K = –8.872e+01 | B = –5.452e–03 | C = 9.315e–02 |
| | D = –1.741e–01 | E = 1.682e–01 | |
| R17: | K = –9.867e+00 | B = 3.615e–02 | C = –4.941e–03 |
| | D = 0 | E = 0 | |
| R18: | K = –4.752e+01 | B = 1.281e–01 | C = 4.215e–02 |
| | D = –7.886e–02 | E = 0 | |

NUMERICAL EXAMPLE 6

| f = 1–10.00 | Fno = 1.85–2.87 | 2ω = 61.8°–6.8° | |
|---|---|---|---|
| R1 = 14.78 | D1 = 0.17 | N1 = 1.92307 | v1 = 18.9 |
| R2 = 4.01 | D2 = 1.04 | N2 = 1.83400 | v2 = 37.2 |
| R3 = –19.47 | D3 = 0.04 | | |
| R4 = 3.02 | D4 = 0.53 | N3 = 1.80400 | v3 = 46.6 |
| R5 = 6.20 | D5 = Variable | | |
| R6 = 5.36 | D6 = 0.12 | N4 = 1.88299 | v4 = 40.8 |
| R7 = 0.96 | D7 = 0.49 | | |
| R8 = –1.13 | D8 = 0.12 | N5 = 1.60311 | v5 = 60.7 |
| R9 = 1.59 | D9 = 0.42 | N6 = 1.84665 | v6 = 23.8 |
| R10 = –48.40 | D10 = Variable | | |
| R11 = 1.45 | D11 = 0.53 | N7 = 1.58913 | v7 = 61.2 |
| R12 = 15.74 | D12 = 0.17 | | |
| R13 = (Stop) | D13 = Variable | | |
| R14 = 1.63 | D14 = 0.13 | N8 = 1.92286 | v8 = 20.9 |
| R15 = 0.94 | D15 = 0.00 | | |
| R16 = 0.93 | D16 = 0.76 | N9 = 1.66910 | v9 = 55.4 |
| R17 = –3.43 | D17 = Variable | | |
| R18 = –7.88 | D18 = 0.12 | N10 = 1.66910 | v10 = 55.4 |
| R19 = 2.55 | D19 = 0.18 | | |
| R20 = ∞ | D20 = 0.86 | N11 = 1.51633 | v11 = 64.2 |
| R21 = ∞ | | | |

| Variable Separations | Focal Length | | |
|---|---|---|---|
| | 1.00 | 4.97 | 10.00 |
| D5 | 0.17 | 2.01 | 2.53 |
| D10 | 2.46 | 0.62 | 0.10 |
| D13 | 0.85 | 0.43 | 0.85 |
| D17 | 0.17 | 0.59 | 0.17 |

Aspheric Coefficients:

| R11: | K = –1.369e+00 | B = 1.569e–02 | C = 3.612e–04 | D = 0 | E = 0 |
|---|---|---|---|---|---|
| R16: | K = –7.890e–02 | B = –2.803e–02 | C = 6.339e–03 | D = 0 | E = 0 |
| R17: | K = –8.678e+00 | B = 3.835e–02 | C = –2.708e–02 | D = 0 | E = 0 |
| R19: | K = –5.409e+01 | B = 3.075e–01 | C = –5.259e–01 | | |
| | D = 4.678e–01 | E = 0 | | | |

NUMERICAL EXAMPLE 7

| f = 1–10.00 | Fno = 1.85–3.12 | 2ω = 61.7°–6.8° | |
|---|---|---|---|
| R1 = 17.63 | D1 = 0.17 | N1 = 1.92286 | v1 = 21.3 |
| R2 = 3.73 | D2 = 0.96 | N2 = 1.80400 | v2 = 46.6 |
| R3 = –14.00 | D3 = 0.04 | | |
| R4 = 2.91 | D4 = 0.47 | N3 = 1.83400 | v3 = 37.2 |
| R5 = 6.27 | D5 = Variable | | |
| R6 = 5.66 | D6 = 0.12 | N4 = 1.88299 | v4 = 40.8 |
| R7 = 0.97 | D7 = 0.46 | | |
| R8 = –1.14 | D8 = 0.12 | N5 = 1.71999 | v5 = 50.3 |
| R9 = 1.33 | D9 = 0.46 | N6 = 1.84665 | v6 = 23.8 |
| R10 = –7.71 | D10 = Variable | | |
| R11 = 1.66 | D11 = 0.49 | N7 = 1.58312 | v7 = 59.4 |
| R12 = –19.39 | D12 = 0.17 | | |
| R13 = (Stop) | D13 = Variable | | |
| R14 = 1.64 | D14 = 0.12 | N8 = 1.92286 | v8 = 21.3 |

-continued

| | | | |
|---|---|---|---|
| R15 = 0.92 | D15 = 0.65 | N9 = 1.67790 | ν9 = 55.3 |
| R16 = -4.74 | D16 = Variable | | |
| R17 = -5.90 | D17 = 0.12 | N10 = 1.69350 | ν10 = 53.2 |
| R18 = 3.95 | D18 = 0.18 | | |
| R19 = ∞ | D19 = 0.85 | N11 = 1.51633 | ν11 = 64.2 |
| R20 = ∞ | | | |

| Variable Separations | Focal Length | | |
|---|---|---|---|
| | 1.00 | 5.01 | 10.00 |
| D5 | 0.17 | 1.96 | 2.46 |
| D10 | 2.39 | 0.60 | 0.10 |
| D13 | 0.93 | 0.45 | 0.93 |
| D16 | 0.17 | 0.64 | 0.17 |

Aspheric Coefficients:

| | | | |
|---|---|---|---|
| R11: | K = -1.210e + 00 | B = 8.608e - 03 | C = -3.275e - 02 |
| | D = 8.391e - 03 | E = -7.306e - 03 | |
| R12: | K = -4.264e + 02 | B = 4.438e - 03 | C = -3.434e - 02 |
| | D = 0 | E = 0 | |
| R16: | K = -8.664e + 01 | B = -2.633e - 02 | C = 1.315e - 01 |
| | D = -1.822e - 01 | E = 7.972e - 02 | |
| R17: | K = -1.529e + 02 | B = 9.781e - 02 | C = -1.234e - 01 |
| | D = 0 | E = 0 | |
| R18: | K = -2.719e + 01 | B = 2.309e - 01 | C = -1.580e - 01 |
| | D = 4.776e - 02 | E = 0 | |

TABLE 2

| | Numerical Example | | |
|---|---|---|---|
| Condition | 5 | 6 | 7 |
| $TD/f_T$ | 0.975 | 0.970 | 0.962 |
| $DT_{23}/f_W$ | 0.098 | 0.098 | 0.098 |
| $\nu_{1N}$ | 18.9 | 18.9 | 21.3 |
| $N_{1N}$ | 1.9231 | 1.9231 | 1.9229 |
| $\lvert f_2/\sqrt{f_W \cdot f_T} \rvert$ | 0.266 | 0.263 | 0.255 |
| $\beta_5$ | 1.446 | 1.507 | 1.482 |

According to the invention, by setting forth the rules of lens design as described above, as applied to the case where, with the use of the rear focus type, the relative aperture and the variable magnification ratio are greatly increased, it is made possible to achieve a zoom lens of the rear focus type in a simple form, which is prevented from increasing in bulk and size, while still permitting a good stability of optical performance to be maintained throughout the entire zooming range and throughout the entire focusing range, and which keeps the predetermined back focal distance.

What is claimed is:

1. A zoom lens comprising, in order from an object side to an image side, a first lens unit having a positive refractive power, a second lens unit having a negative refractive power, a third lens unit having a positive refractive power, a fourth lens unit having a positive refractive power and a fifth lens unit having a negative refractive power, wherein at least said second lens unit and said fourth lens unit are moved to vary magnification and said fourth lens unit is moved to effect focusing, and wherein an aperture stop is located in a space between said third lens unit and said fourth lens unit.

2. A zoom lens according to claim 1, satisfying the following condition:

$$0.04 < D_{23}/f_W < 0.21$$

where $D_{23}$ is an air separation between a lens surface nearest to the image side of said second lens unit and a lens surface nearest to the object side of said third lens unit for an infinitely distant object in a telephoto end, and $f_W$ is a focal length in a wide-angle end of said zoom lens.

3. A zoom lens according to claim 1, satisfying the following condition:

$$0.11 < D_S/f_W < 0.45$$

where $D_S$ is a distance between a lens surface nearest to the image side of said third lens unit in a wide-angle end and said aperture stop, and $f_W$ is a focal length in the wide-angle end of said zoom lens.

4. A zoom lens of rear focus type, comprising, in order from an object side to an image side, a first lens unit of positive refractive power, a second lens unit of negative refractive power, a third lens unit of positive refractive power, a fourth lens unit of positive refractive power and a fifth lens unit of negative refractive power, wherein said second lens unit is moved toward the image side to vary magnification from a wide-angle end to a telephoto end while said fourth lens unit is moved to compensate for the shift of an image plane caused by the variation of magnification, and said fourth lens unit is moved to effect focusing, and wherein the following condition is satisfied:

$$0.8 \leq TD/f_T \leq 1.0$$

where TD is a distance from a first lens surface nearest to the object side to a paraxial image plane, and $f_T$ is a focal length in the telephoto end of said zoom lens.

5. A zoom lens of rear focus type according to claim 4, satisfying the following condition:

$$0.05 < DT_{23}/f_W < 0.2$$

where $DT_{23}$ is an air separation between a lens surface nearest to the image side of said second lens unit and a lens surface nearest to the object side of said third lens unit in the telephoto end, and $f_W$ is a focal length in the wide-angle end of said zoom lens.

6. A zoom lens of rear focus type according to claim 4, further comprising an aperture stop located in a space between said third lens unit and said fourth lens unit.

7. A zoom lens of rear focus type according to claim 4, wherein said first lens unit has at least one negative lens, and wherein the following conditions are satisfied:

$$\nu_{1N} < 23$$

$$1.85 < N_{1N}$$

where $N_{1N}$ and $\nu_{1N}$ are a refractive index and an Abbe number of a material of said negative lens, respectively.

8. A zoom lens of rear focus type according to claim 4, satisfying the following conditions:

$$0.2 < \lvert f_2/\sqrt{f_W \cdot f_T} \rvert < 0.3$$

$$1.2 < \beta_5 < 2.0$$

where $f_2$ is a focal length of said second lens unit, $\beta_5$ is an image forming magnification of said fifth lens unit, and $f_W$ is a focal length in the wide-angle end of said zoom lens.

* * * * *

UNITED STATES PATENT AND TRADEMARK OFFICE
CERTIFICATE OF CORRECTION

PATENT NO.   :   5,818,646

DATED        :   October 6, 1998

INVENTOR(S)  :   Hiroyuki HAMANO

Page 1 of 2

It is certified that error appears in the above-identified patent and that said Letters Patent is hereby corrected as shown below:

COLUMN 5:

Line 3, "colliding" should read --colliding with--.
Line 6, "$D_s$between" should read --$D_s$ between--.

COLUMN 7:

Line 1, "lens." should read --lens--.

COLUMN 14:

Line 2, "R16: K = -8 872e+01" should read --R16: K = -8.872e+01--.

UNITED STATES PATENT AND TRADEMARK OFFICE
CERTIFICATE OF CORRECTION

PATENT NO. : 5,818,646

DATED : October 6, 1998

INVENTOR(S) : Hiroyuki HAMANO

It is certified that error appears in the above-identified patent and that said Letters Patent is hereby corrected as shown below:

COLUMN 16:

Line 39, "$f\ _w$" should read --$f_w$--.

Signed and Sealed this

First Day of June, 1999

Attest:

*Attesting Officer*

Q. TODD DICKINSON

*Acting Commissioner of Patents and Trademarks*